(12) United States Patent
Fu et al.

(10) Patent No.: US 10,439,806 B2
(45) Date of Patent: Oct. 8, 2019

(54) METHOD AND SYSTEM FOR SECURE DATA TRANSMISSION

(71) Applicant: Alibaba Group Holding Limited, George Town, Grand Cayman (KY)

(72) Inventors: Yingfang Fu, Hangzhou (CN); Shuanlin Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 354 days.

(21) Appl. No.: 15/588,462

(22) Filed: May 5, 2017

(65) Prior Publication Data
US 2017/0338951 A1 Nov. 23, 2017

(30) Foreign Application Priority Data
May 19, 2016 (CN) .......................... 2016 1 0339148

(51) Int. Cl.
*H04L 9/00* (2006.01)
*H04L 9/08* (2006.01)
*H04L 9/14* (2006.01)
*H04L 9/32* (2006.01)
(Continued)

(52) U.S. Cl.
CPC .......... *H04L 9/0852* (2013.01); *H04L 9/0894* (2013.01); *H04L 9/14* (2013.01); *H04L 9/3236* (2013.01); *H04L 63/0435* (2013.01); *H04L 63/0869* (2013.01); *H04L 9/30* (2013.01);
(Continued)

(58) Field of Classification Search
CPC ............ H04L 63/06; H04L 9/00; G06F 21/60
See application file for complete search history.

(56) References Cited

U.S. PATENT DOCUMENTS

| 5,307,410 A | 4/1994 | Bennett |
| 5,675,648 A | 10/1997 | Townsend |
| 6,505,247 B1 | 1/2003 | Steger |

(Continued)

FOREIGN PATENT DOCUMENTS

| EP | 0962070 | 12/1999 |
| EP | 0962070 B1 | 12/1999 |

(Continued)

OTHER PUBLICATIONS

Mark Hillery et al. "Quantum Secret Sharing", American Physical Society 1999.

(Continued)

*Primary Examiner* — Izunna Okeke
(74) *Attorney, Agent, or Firm* — Shun Yao; Park, Vaughan, Fleming & Dowler LLP

(57) ABSTRACT

One embodiment described herein provides a system and method for establishing a secure communication channel between a client and a server. During operation, the client generates a service request comprising a first dynamic message, transmits the first service request to the server, which authenticates the client based on the first dynamic message, and receives a second dynamic message from the server in response to the first dynamic message. The client authenticates the server based on the second dynamic message, and negotiates, via a quantum-key-distribution process, a secret key shared between the client and the server. The client and server then establish a secure communication channel based on at least a first portion of the secret key.

17 Claims, 11 Drawing Sheets

(51) Int. Cl.
    *H04L 29/06*       (2006.01)
    *H04L 9/30*        (2006.01)
(52) U.S. Cl.
    CPC ........ *H04L 63/0823* (2013.01); *H04L 63/166* (2013.01); *H04L 2209/08* (2013.01)

(56) References Cited

U.S. PATENT DOCUMENTS

| | | | |
|---|---|---|---|
| 9,077,577 | B1 | 7/2015 | Ashrafi |
| 9,130,742 | B2 | 9/2015 | Yao |
| 9,294,267 | B2 | 3/2016 | Kamath |
| 9,323,901 | B1 | 4/2016 | Nair |
| 9,887,976 | B2 | 2/2018 | Hughes |
| 2005/0071677 | A1 | 3/2005 | Khanna |
| 2005/0135620 | A1 | 6/2005 | Kastella |
| 2005/0144440 | A1 | 6/2005 | Catherman |
| 2005/0144484 | A1 | 6/2005 | Wakayama |
| 2005/0259825 | A1 | 11/2005 | Trifonov |
| 2006/0026693 | A1 | 2/2006 | Bade |
| 2006/0056630 | A1 | 3/2006 | Zimmer |
| 2007/0016794 | A1 | 1/2007 | Harrison |
| 2007/0076889 | A1 | 4/2007 | Derobertis |
| 2007/0147292 | A1 | 6/2007 | Van Ewijk |
| 2007/0192598 | A1 | 8/2007 | Troxel |
| 2008/0114983 | A1 | 5/2008 | Sherkin |
| 2008/0123859 | A1 | 5/2008 | Mamidwar |
| 2008/0165973 | A1 | 7/2008 | Miranda Gavillan |
| 2008/0219449 | A1 | 9/2008 | Ball |
| 2008/0222734 | A1 | 9/2008 | Redlich |
| 2009/0034733 | A1 | 2/2009 | Raman |
| 2009/0055892 | A1 | 2/2009 | Lu |
| 2009/0092252 | A1 | 4/2009 | Noll |
| 2009/0106551 | A1 | 4/2009 | Boren |
| 2009/0204812 | A1 | 8/2009 | Baker |
| 2009/0271634 | A1 | 10/2009 | Boult |
| 2010/0169953 | A1 | 7/2010 | Hofer |
| 2010/0199336 | A1 | 8/2010 | Tan |
| 2010/0211787 | A1 | 8/2010 | Bukshpun |
| 2010/0265077 | A1 | 10/2010 | Humble |
| 2010/0299526 | A1* | 11/2010 | Wiseman ............ H04L 9/0855 713/171 |
| 2011/0069972 | A1 | 3/2011 | Wiseman |
| 2011/0099367 | A1 | 4/2011 | Thom |
| 2011/0126011 | A1 | 5/2011 | Choi |
| 2011/0209202 | A1 | 8/2011 | Otranen |
| 2011/0213979 | A1 | 9/2011 | Wiseman |
| 2011/0231615 | A1 | 9/2011 | Ober |
| 2012/0045002 | A1 | 2/2012 | Zivkovic |
| 2012/0166993 | A1 | 6/2012 | Anderson |
| 2012/0177201 | A1 | 7/2012 | Ayling |
| 2012/0210408 | A1 | 8/2012 | Lu |
| 2012/0250863 | A1 | 10/2012 | Bukshpun |
| 2012/0265892 | A1 | 10/2012 | Ma |
| 2013/0083926 | A1 | 4/2013 | Hughes |
| 2013/0101119 | A1 | 4/2013 | Nordholt |
| 2013/0208894 | A1 | 8/2013 | Bovino |
| 2013/0227286 | A1 | 8/2013 | Brisson |
| 2013/0246641 | A1 | 9/2013 | Vimpari |
| 2013/0251145 | A1 | 9/2013 | Lowans |
| 2013/0315395 | A1 | 11/2013 | Jacobs |
| 2014/0068765 | A1 | 3/2014 | Choi |
| 2014/0141725 | A1 | 5/2014 | Jesme |
| 2014/0237565 | A1 | 8/2014 | Fleysher |
| 2014/0259138 | A1 | 9/2014 | Fu |
| 2014/0281511 | A1 | 9/2014 | Kaushik |
| 2014/0331050 | A1 | 11/2014 | Armstrong |
| 2014/0351915 | A1 | 11/2014 | Otranen |
| 2015/0046709 | A1 | 2/2015 | Anspach |
| 2015/0095987 | A1 | 4/2015 | Potash |
| 2015/0181308 | A1 | 6/2015 | Ducharme |
| 2015/0222619 | A1 | 8/2015 | Hughes |
| 2015/0236852 | A1 | 8/2015 | Tanizawa |
| 2015/0270963 | A1* | 9/2015 | Tanizawa ............ H04L 9/16 713/171 |
| 2015/0288517 | A1 | 10/2015 | Evans |
| 2015/0288542 | A1 | 10/2015 | Ashrafi |
| 2015/0317469 | A1 | 11/2015 | Liu |
| 2015/0325242 | A1 | 11/2015 | Lu |
| 2015/0326613 | A1 | 11/2015 | Devarajan |
| 2015/0350181 | A1 | 12/2015 | Call |
| 2015/0379261 | A1 | 12/2015 | Daigle |
| 2015/0381363 | A1 | 12/2015 | Teixeira |
| 2016/0021068 | A1 | 1/2016 | Jueneman |
| 2016/0080708 | A1 | 3/2016 | Urata |
| 2016/0105439 | A1 | 4/2016 | Hunt |
| 2016/0127127 | A1* | 5/2016 | Zhao .................... H04L 9/0852 713/171 |
| 2016/0210105 | A1 | 7/2016 | Ru |
| 2016/0226846 | A1 | 8/2016 | Fu |
| 2016/0241396 | A1 | 8/2016 | Fu |
| 2016/0248581 | A1 | 8/2016 | Fu |
| 2016/0294783 | A1 | 10/2016 | Piqueras Jover |
| 2016/0359839 | A1 | 12/2016 | Natividad |
| 2017/0034167 | A1 | 2/2017 | Figueira |
| 2017/0230173 | A1 | 8/2017 | Choi |
| 2017/0302448 | A1 | 10/2017 | Luk |
| 2017/0324730 | A1 | 11/2017 | Otranen |
| 2018/0048466 | A1 | 2/2018 | Chen |

FOREIGN PATENT DOCUMENTS

| | | |
|---|---|---|
| WO | 2012098543 | 7/2012 |
| WO | 2013026086 | 2/2013 |
| WO | 2016070141 | 5/2016 |

OTHER PUBLICATIONS

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www. elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

* cited by examiner

METHOD AND SYSTEM FOR SECURE DATA TRANSMISSION

RELATED APPLICATION

Under 35 U.S.C. 119, this application claims the benefit and right of priority of Chinese Patent Application No. 201610339148.7, filed on 19 May 2016.

BACKGROUND

Field

This disclosure is generally related to secure data transmission technologies. More specifically, this disclosure is related to a quantum state based secure data transmission system.

Related Art

With the exponential growth in data communication and telecommunication over computer networks including the Internet, the technologies to protect private information transmitted on these computer networks from eavesdropping and other attacks have also been constantly improving and evolving. Various data encryption techniques have been used to protect various user data transmitted over the Internet, including search requests, search results, and financial information related to e-commerce. These technologies include both symmetric and asymmetric encryption technologies, have been used. Symmetric encryption algorithms are typically more efficient than asymmetric encryption algorithms. However, distribution of the encryption/decryption key between communication parties can pose certain security risks. Asymmetric encryption (also called public key encryption), on the other hand, does not have the key distribution problem, because different keys (public and private) are used to encrypt and decrypt data. Public key encryptions are often used for secure exchange of symmetric encryption keys. Public key cryptography systems are considered more secure, because they rely on cryptographic algorithms based on mathematical problems that currently admit no efficient solution, particularly those inherent in certain integer factorization, discrete logarithm, and elliptic curve relationships.

One of the secure Internet protocols, HTTPS (Hypertext Transfer Protocol Secure) plays an important role in Internet-based commercial activities. For example, it has been used for payment transactions or banking activities on the World Wide Web. In a conventional HTTPS setting, before data transmission, the server side and client side agree on an encryption scheme and keys that will be used to exchange data. The client may generate a pre-master key, encrypt the pre-master key using the server's public key, and send the encrypted pre-master key to the server. Both the server and client can then generate a master key (also known as the session key) from the pre-master key. The session key can then be used to encrypt data flows between the client and server.

Although current secure data transmission technologies, including HTTPS, can provide certain protections against common attacks, such as simple man-in-the-middle attacks and eavesdropping attacks, they may still be vulnerable to other types of attacks. For example, HTTPS can be vulnerable to more sophisticated man-in-the-middle attacks and a range of traffic analysis attacks. Moreover, the advance in computational capabilities provided by cloud computing and quantum computing has increased the possibility of successful brute-force attacks. For example, an attacker may obtain the public-key-encrypted master key via eavesdropping and launch a brute-force attack to obtain the master key. As a result, any subsequent data communication using that master key will be compromised.

Moreover, the current key-distribution process can be time-consuming due to the complexity of the involved asymmetric encryption algorithm. Using the HTTPS protocol as an example, the amount of computation used for asymmetric encryption/decryption alone can take up 90% of the computation needed for the Transport Layer Security (TLS) or Secure Socket Layer (SSL). This can lead to the slow response time for establishing an HTTPS channel.

SUMMARY

One embodiment described herein provides a system and method for establishing a secure communication channel between a client and a server. During operation, the client generates a service request comprising a first dynamic message, transmits the first service request to the server, which authenticates the client based on the first dynamic message, and receives a second dynamic message from the server in response to the first dynamic message. The client authenticates the server based on the second dynamic message, and negotiates, via a quantum-key-distribution process, a secret key shared between the client and the server. The client and server then establish a secure communication channel based on at least a first portion of the secret key.

In a variation on this embodiment, establishing the secure communication channel comprises using the first portion of the secret key as a symmetric encryption/decryption key for data transmission.

In a variation on this embodiment, the first dynamic message includes at least one of: identification (ID) of the client, a first hash function calculated based on the client's ID and a client-specific key previously shared between the client and the server, and a random number.

In a further variation, the client encrypts the random number using the client-specific key.

In a further variation, the second dynamic message includes a second hash function of the random number or a concatenation of the server's ID and the random number.

In a further variation, authenticating the server involves calculating a third hash function based at least on the random number and comparing the calculated third hash function with the second hash function included in the second dynamic message.

In a further variation, the client further extracts a second portion of the secret key and updates the client-specific key using a second portion of the secret key.

One embodiment described herein provides a system and method for establishing a secure communication channel between a client and a server. During operation, the server receives a service request comprising a first dynamic message from the client, and authenticates the client based on the first dynamic message. The server generates a second dynamic message based on information included in the first dynamic message and sends the second dynamic message to the client, which authenticates the server based on the second dynamic message. The server negotiates, via a quantum-key-distribution process, a secret key shared between the client and the server. The client and server then establish a secure communication channel by using at least a first portion of the secret key as a symmetric encryption/decryption key for data transmission.

Figure 1:
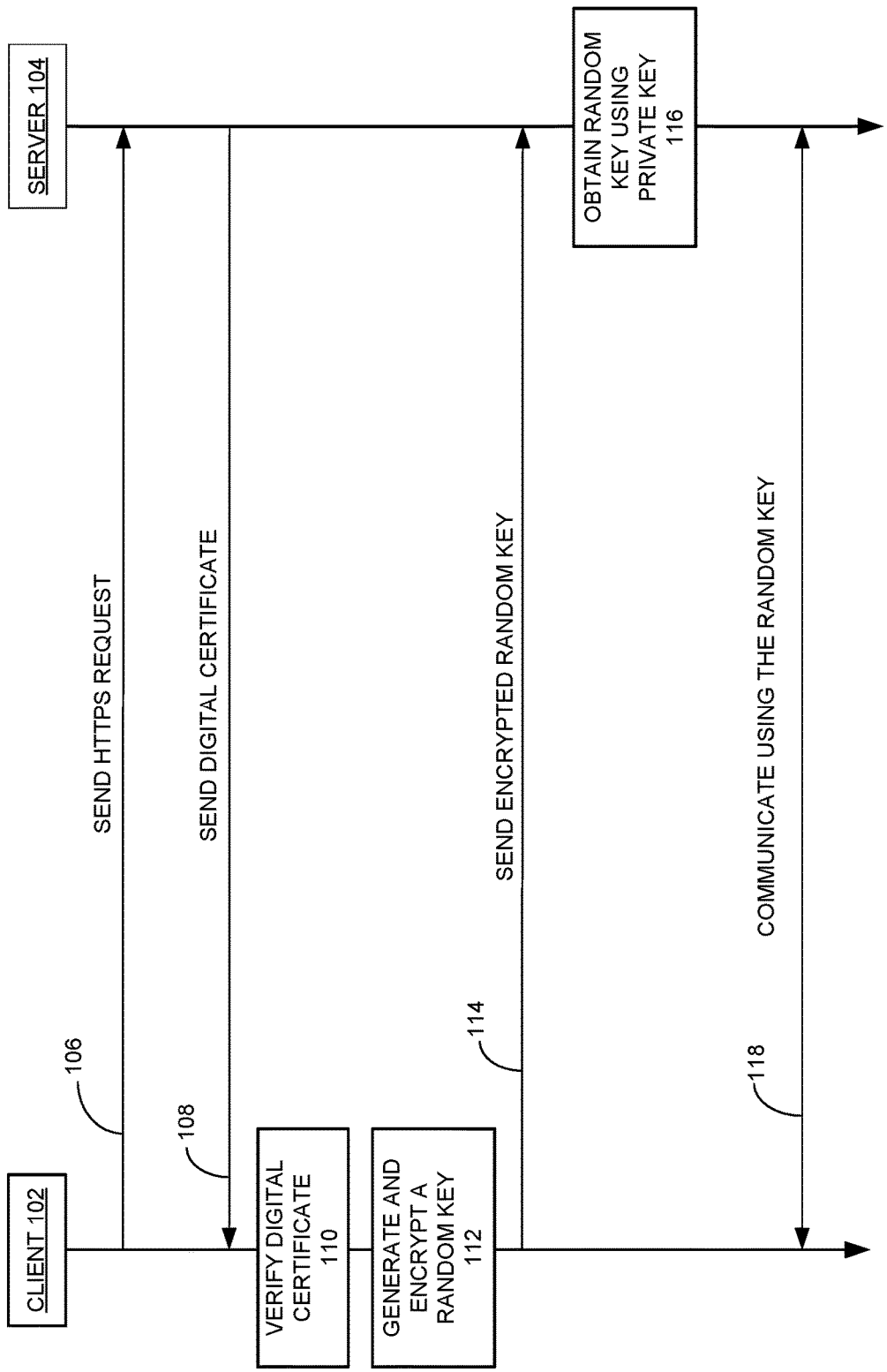
FIG. 1 illustrates a time-state diagram describing the process of establishing a conventional HTTPS session.

Table 1 illustrates two exemplary mechanical quantity measurement schemes based on using two different sets of quantum states, in accordance with one embodiment described herein.

Table II illustrates the mapping between client IDs and client-specific keys, in accordance with one embodiment described herein.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, two types of optical signals are introduced, one is the regular optical signal and the other is the quantum optical signal. Regular optical signals can be used in traditional communication systems where laws of classical mechanics apply, whereas quantum optical signals can be used in quantum communication systems where laws of quantum mechanics apply. A quantum optical signal typically can consist of weak coherent pulses, ideally one photon in each pulse. On the other hand, an optical pulse in a regular optical signal often has many more photons and, hence, has much higher intensity. In this disclosure, a regular optical signal can also referred to as a high-intensity optical signal, due to its higher intensity compared to a quantum optical signal.

In quantum communication, information is transmitted based on quantum states, and the data security can be guaranteed by the laws of quantum mechanics, such as the uncertainty principle, the principle of quantum state measurement, and the no-cloning theorem. It has been shown that quantum cryptography can achieve unconditional data transmission security and detectability against eavesdroppers.

Various embodiments disclosed herein provide a system and method for establishing a secure communication channel between a server and a client. More specifically, to reduce the amount of computation needed for asymmetric key exchange and to enhance security, the server and client can authenticate each other using a hash-based technique (e.g., by calculating the hash value of a client- or node-specific key known only to the server and client). After authentication, the server and client can exchange a symmetric session key using a quantum key-exchange process. The symmetric session key can then be used for establishing a secure channel between the client and server. In addition to the symmetric session key, information exchanged during the quantum key-exchange process can also include a new node-specific key that can later be used to authenticate the client and the server. By eliminating the asymmetric encryption/decryption used during conventional key-exchange processes and by using quantum key exchange, the disclosed process of establishing a secure communication channel can provide greater security while being more computationally efficient.

Background

Basic Quantum Theory

According to quantum physics, some physical quantities of the microscopic world cannot continuously change but take on certain discrete values, and the difference between two adjacent discrete values is referred to as a "quantum," e.g., a photon is a single quantum of light.

Quantum States

In traditional communication where laws of classical mechanics apply, digital information can be represented as bits, wherein each bit can have two states: e.g., "0s" and "1s," or "high" and "low" voltages. In contrast, in quantum communication where laws of classical mechanics apply, information is typically represented as quantum bits (qubits), which is a unit of quantum information. Each qubit can have two basic states: $|0\rangle$ or $\leftrightarrow$ and $|1\rangle$ or $\updownarrow$. In this case, the two quantum states $|0\rangle$ and $|1\rangle$ form a quantum state basis, which can be expressed as $\{|0\rangle, |1\rangle\}$.

Moreover, a quantum quantity can also take on a mixed state obtained by the superposition of the two basic states with coefficients $\alpha$, $\beta$, respectively. For example, if quantum basis $\{|0\rangle, |1\rangle\}$ is used, then a mixed state can be expressed as:

$$|\varphi\rangle = \alpha|0\rangle + \beta|1\rangle.$$

For example, mixed quantum state basis $\{|+\rangle, |-\rangle\}$ can be generated by superpositioning the basic quantum states $|0\rangle/\leftrightarrow$ and $|1\rangle/\updownarrow$ using the following formulae:

$$|+\rangle = \frac{\leftrightarrow + \updownarrow}{\sqrt{2}},$$

$$|-\rangle = \frac{\leftrightarrow - \updownarrow}{\sqrt{2}}.$$

Note that in the above two bases of quantum state representations, states $|0\rangle$ and $|1\rangle$ are orthogonal to each other while states $|+\rangle$ and $|-\rangle$ are orthogonal to each other.

Principle of Quantum Measurements

In quantum mechanics, a given mechanical quantity can be measured using above-described quantum states, which are also referred to as "measurement basis." For example, each mechanical quantity can be expressed by a Hermitian operator (or Hermitian matrix). When measuring such a mechanical quantity, the measurement results correspond to the eigenvalues (or the "characteristic values") of the Hermitian operator for this mechanical quantity. After the measurement, the quantum state being measured collapses to the eigenstates (or the "eigenvectors") corresponding to the obtained eigenvalues. Table 1 illustrates two exemplary mechanical quantity measurement schemes based on using two different sets of quantum states in accordance with one embodiment described herein.

TABLE I

| Mechanical Quantity Measurement Using a Set of Quantum States | | |
|---|---|---|
| Mechanical Quantity $Z = \begin{pmatrix} 1 & 0 \\ 0 & -1 \end{pmatrix}$ | Eigenvalues: 1, -1 Eigenstates: $\|0\rangle, \|1\rangle$ | Referred to as measuring using set $\{\|0\rangle, \|1\rangle\}$ |
| Mechanical Quantity $Z = \begin{pmatrix} 0 & 1 \\ 1 & 0 \end{pmatrix}$ | Eigenvalues: 1, -1 Eigenstates: $\|+\rangle, \|-\rangle$ | Referred to as measuring using set $\{\|+\rangle, \|-\rangle\}$ |

For example, when using quantum state basis $\{|0\rangle, |1\rangle\}$ to measure quantum state $|\varphi\rangle = \alpha|0\rangle + \beta|1\rangle$, wherein $|\alpha|^2 + |\beta|^2 = 1$, we will obtain a measurement value 1 with a probability of $|\alpha|^2$, wherein after the measurement the quantum state collapses to $|0\rangle$; and we will obtain a measurement value -1 with a probability of $|\beta|^2$, wherein after the measurement the quantum state collapses to $|1\rangle$.

As another example, when using quantum state basis $\{|0\rangle, |1\rangle\}$ to measure quantum state $|0\rangle$, we will obtain state $|0\rangle$ with probability 1. Similarly, when using quantum state basis $\{|+\rangle, |-\rangle\}$ to measure quantum state $|+\rangle$, we will obtain state $|+\rangle$ with probability 1.

Furthermore, when using quantum state basis $\{|0\rangle, |1\rangle\}$ to measure quantum state $|+\rangle$, we will randomly obtain either state $|1\rangle$ or state $|1\rangle$. Similarly, when using quantum state basis $\{|+\rangle, |-\rangle\}$ to measure state $|0\rangle$, we will randomly obtain either state $|+\rangle$ or state $|-\rangle$.

Conventional HTTPS

FIG. 1 illustrates a time-state diagram describing the process of establishing a conventional HTTPS session. During operation, a client 102 sends an HTTPS request to a server 104 (operation 106). For example, a user may type in the address bar of the web browser the address of an HTTPS website. The HTTPS website transmits a digital certification (e.g., a Secure Sockets Layer (SSL) certificate) to the web browser of client 102 (operation 108). The SSL certification can be one obtained from a trust authority or one generated by server 104. Self-generated or self-signed digital certificate may need to be verified by client 102 in order for the process to continue. The digital certificate can include a public key needed to begin the secure session. The digital certificate may also include other useful information, including the name of the certificate authority, expiration date, etc. The public key and its corresponding private key can be generated using various asymmetric algorithms, such as RSA.

Upon receiving the digital certification, client 102 verifies the digital certificate (operation 110). If the digital certificate is invalid, client 102 may display an error message in its browser. If the digital certificate is valid client 102 can generate a random key (e.g., a random number) and encrypt the generated random key using the public key included in the digital certificate (operation 112). Client 102 then sends the encrypted random key to server 104 (operation 114), which can then obtain the random key using its private key (operation 116). The random key becomes the shared secrete between client 102 and server 104. The client and server can then communicate with each other using the random key (operation 118). For example, the server may send encrypted content using the random key, and the client can decrypt the content using the same random key.

The current HTTPS technology has certain security deficiencies. For example, it can be vulnerable to the man-in-the-middle (MITM) attacks. Note that, when the digital certificate is not verified, the client browser often displays a warring message and let the user to choose whether to continue. Many users ignore the warning and suffer the SSL man-in-the-middle attacks. Moreover, although the exchange of the shared secret (i.e., the random key) between the client and server is protected by the public key encryption mechanism, advancement made in cloud computing or quantum computing has made classical cryptograph schemes less secure. For example, Shor's algorithm has shown the ability to break public-key cryptography schemes (e.g., RSA), and Grover's algorithm has significantly reduces the amount of computation used to brute-force symmetric cryptographic keys.

In addition to the security deficiency, the current HTTPS also suffers from being computational heavy and time-consuming, especially the asymmetrical encryption and decryption of the random key. A more efficient and secure way for establishing a secure channel is needed.

Assumptions

In some embodiments, the disclosed secure data transmission technique is based on the following assumptions. It is assumed that the classical channel meets the conventional requirements of a secure channel, such as an HTTPS channel. For example, it can be assumed that, before starting data communication, each of the client and the server has its own public and private key pairs and an associated identity certificate.

During initialization, the client can obtain a node-specific key from the server. This process can involve asymmetric encryption/decryption. For example, client A may send a request carrying its public key certificate to the server. The server can verify the certificate and transmit a key (which can be encrypted using the public key of client A) that is specifically assigned to client A back to client A. Similarly, client B may send a request carrying its public key certificate to the server to obtain a key that is specifically assigned to client B. The server can maintain a mapping between the clients and the client- or node-specific key. To further increase security, the client- or node-specific key can be dynamically updated. For example, the server may periodically or at random intervals send updated client-specific keys to clients. Alternatively, a client may also periodically or at random intervals request the updated client-specific key.

In addition, each of the communication parties (e.g., the server and client) installs a lightweight quantum state basis library. The quantum-state-basis library stores a plurality of quantum state bases, each of which including orthogonal quantum states, which can be labeled for differentiation. For example, if we label the orthogonal basis $\{|0\rangle, |1\rangle\}$ as "1,"

Figure 2:
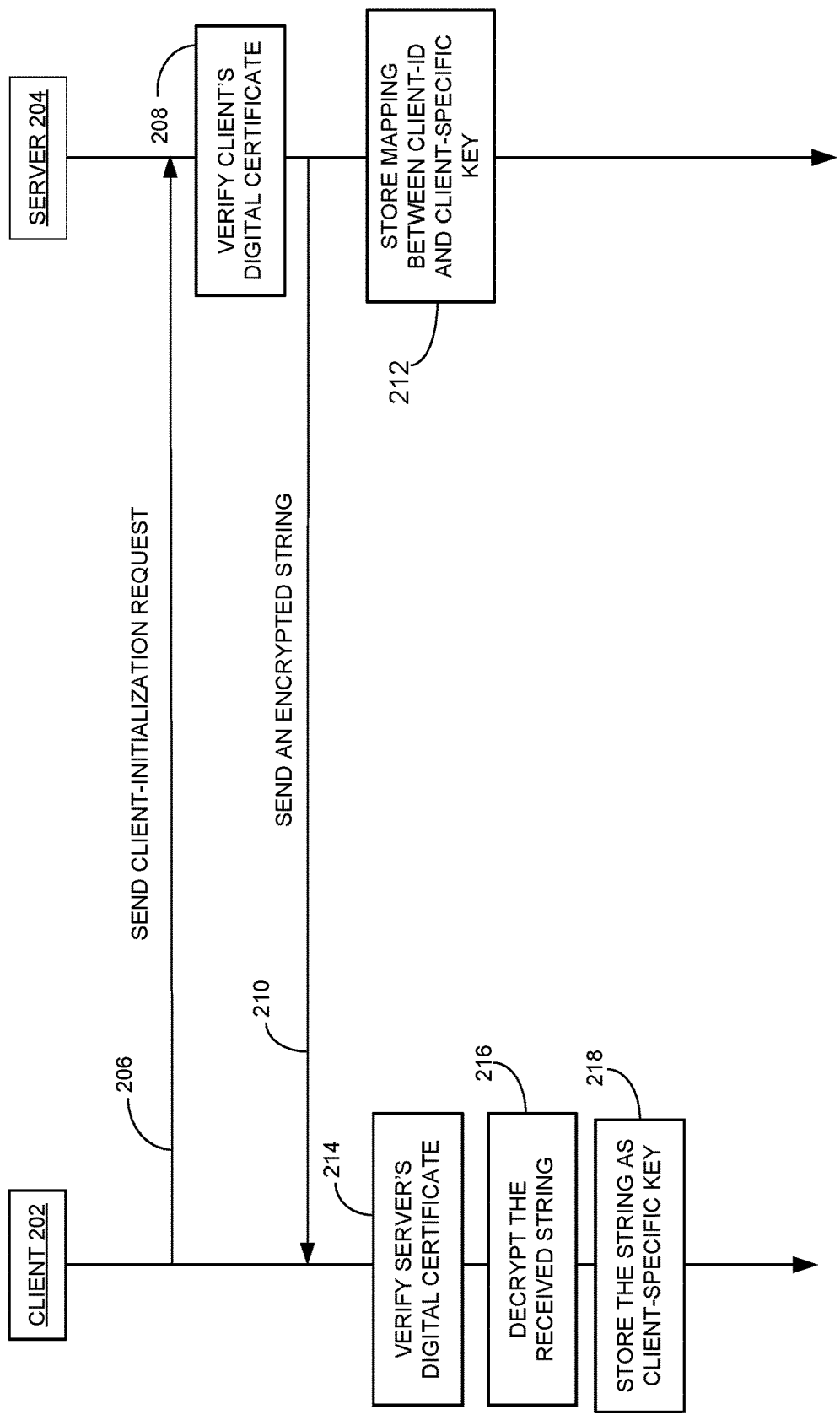
FIG. 2 presents a time-state diagram describing the process of system initialization, according to one embodiment of the present invention.

FIG. 2 presents a time-state diagram describing the process of system initialization, according to one embodiment of the present invention. During operation, a client 202 sends a client-initialization request to a server 204 (operation 206). The request includes a digital certificate that can be used to authenticate client 202. The client's digital certificate can also include a public key of client 202.

Upon receiving the client-initialization request, server 204 verifies the client's digital certificate (operation 208). If the client's digital certificate is invalid, server 204 may send an error message or a warning to client 202, and discards the request. If the client's digital certificate is valid, server 204 can respond to the client-initialization request by sending a string encrypted using the public key of client 202 (operation 210). This string will later serve as a client-specific key of client 202. In other words, server 204 will not send the same string to any other client. Server 204 can store the mapping between client 202 and its client-specific key in a key database (operation 212). For example, the key database can include a table indexed by the identification of each client (CID), as shown below.

TABLE II

| Mapping between Client IDs and Client-Specific Keys | | | | |
|---|---|---|---|---|
| | Client ID | | | |
| | CID_A | CID_B | CID_C | ... CID_G |
| Client-Specific Key | CID_A_Key | CID_B_Key | CID_C_Key | ... CID_G_Key | then state $|0\rangle$ can be labeled as 1.1, and state $|1\rangle$ as 1.2; then we label the orthogonal basis $\{|+\rangle, |-\rangle\}$ as "2," then state $|+\rangle$ can be labeled as 2.1, and state $|-\rangle$ as 2.2, and so on. In some embodiments, each quantum state basis in the quantum-state-basis library can be identified by a unique quantum state basis identifier (QID).

In some embodiments, the quantum states can be periodically relabeled in a synchronized manner on both the client and server sides based on a predetermined relabeling scheme. For example, if x represents the current identifier of a given quantum state, while y represents the identifier of the same quantum state for the next service request, then y can be deduced from x using some deduction rules. For example, the deduction rule can be y=2x; or y=2+x, or other rules negotiated and agreed between the client and the server before the authentication process between the client and the server. In some embodiments, in light of the disclosed dynamic-password authentication technique, the client can use the quantum states of a quantum state basis as the measurement basis for measuring the dynamic information transmitted by the server; while the server can use the same quantum state basis to encode the dynamic information.

Hash-Based and Quantum-Enhanced Secure Data Transmission

In some embodiments, the disclosed secure data transmission technique can include certain security measures used by classical HTTPS communication, such as an encrypted secure communication channel. However, instead of using public key certificate for authentication and key exchange, the authentication process now involves a hash-based authentication process, and the key exchange involves a quantum key-exchange process. Other than during system initialization, which establishes the node-specific key for a client, subsequent communications between the server and the client do not involve any asymmetric algorithms.

In some embodiments, server 204 can also include in its response to client 202 its own digital certificate. Upon receiving the response from server 204, client 202 verifies the server's digital certificate (operation 214). If the server's digital certificate is invalid, client 202 may halt any further communication. If the server's digital certificate is valid, client 202 can decrypt, using its corresponding private key, the client-specific key included in the response from server 204 (operation 216). Client 202 can then store the client-specific key and completes the system initialization (operation 218).

Figure 3A:
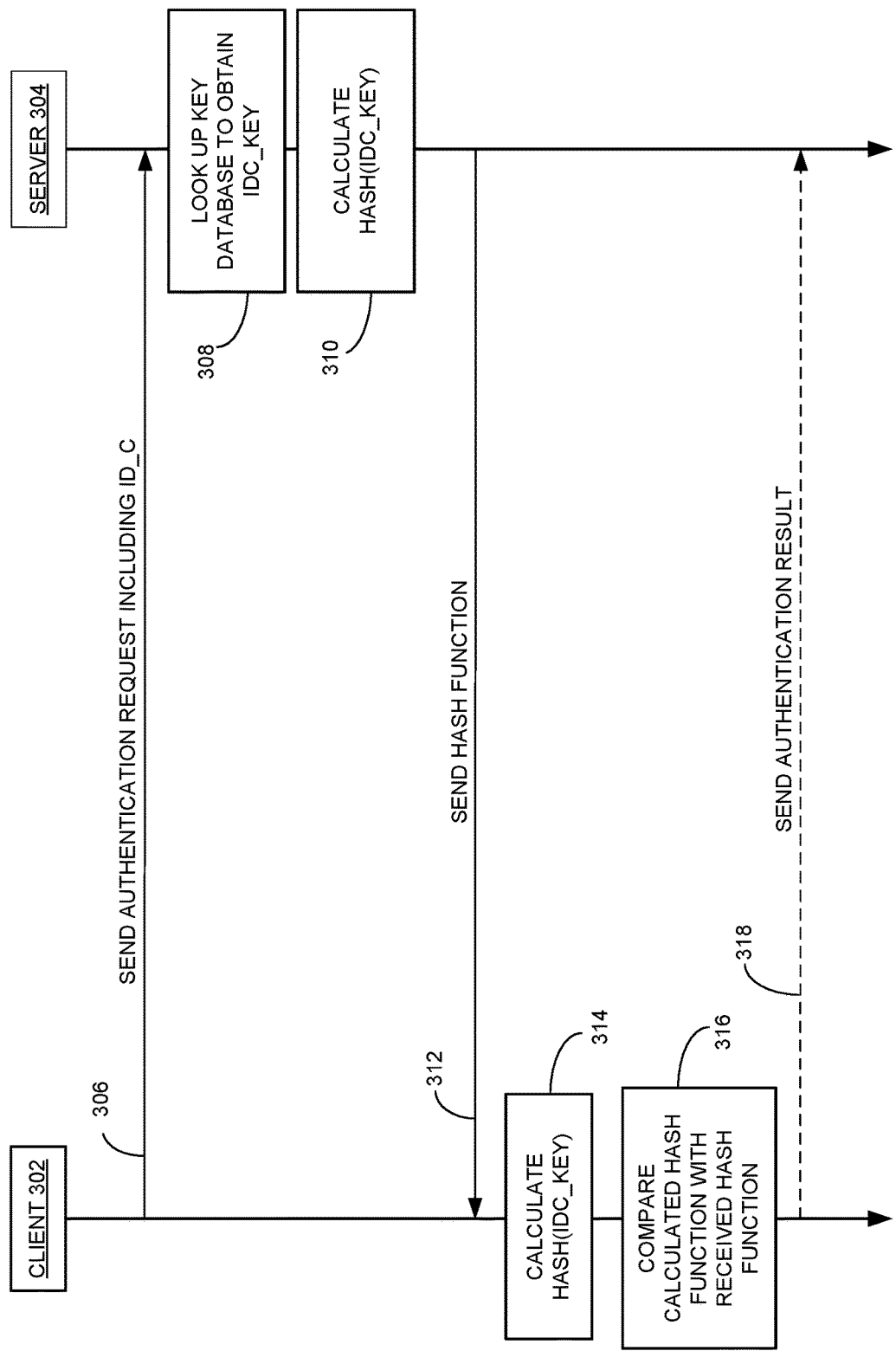
FIG. 3A presents a time-state diagram describing the process of authenticating a server by a client, according to one embodiment of the present invention.

Once the system is initialized (i.e., once the client obtains the client-specific key from the server), the client and the server can authenticate each other using such a client-specific key. FIG. 3A presents a time-state diagram describing the process of authenticating a server by a client, according to one embodiment of the present invention. During operation, a client 302 can send an authentication request that includes the identification (ID) of client 302 in plain text, expressed as ID_C, to a server 304 (operation 306). Upon receiving the authentication request, server 304 can perform a lookup in its key database to obtain the key that is specifically assigned to client 302, expressed as IDC_Key (operation 308), and calculate its hash function (e.g., a cryptographic hash function), hash (IDC_Key) (operation 310). Note that the way the hash function is calculated has been previously agreed on between server 304 and client 302. Server 304 can then send the calculated hash function back to client 302 as a response to the authentication request (operation 312). Upon receiving the response, client 302 can calculate the same hash function of its locally stored client-specific key (operation 314) and compares its calculated hash function with the hash function received from server 304 (operation 316). If they match, client 302 can successfully authenticate server 304. Otherwise, authentication of server 304 is failed. Client 302 can optionally send the authentication result back to server 304 (operation 318).

Note that, in addition to calculating and sending the hash function of IDC_Key, server 304 can also send additional information that can be used by client 302 for authentication of server 304. For example, the server may also send its own identification (ID_S) along with the hash function of the client-specific key. In some embodiments, the server can calculate the hash function of (ID_S, IDC_Key), which is the concatenation of the two strings, and send {ID_S, hash (ID_S, IDC_Key)} to the client. The client can then use the received ID_S and its locally stored IDC_Key to calculate hash (ID_S, IDC_Key) and compare its calculated hash function with the one sent by the server.

Figure 3B:
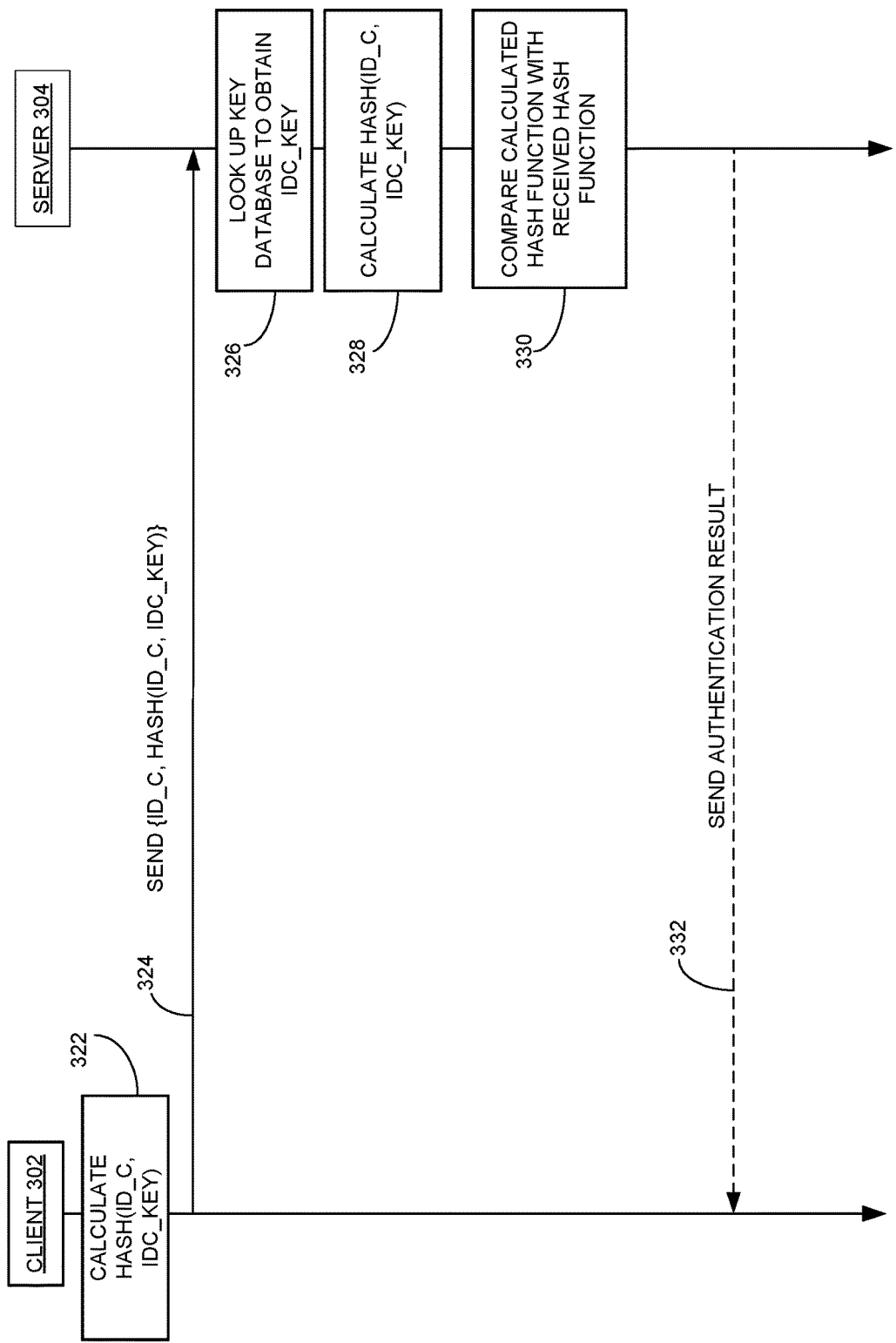
FIG. 3B presents a time-state diagram describing the process of authenticating a client by a server, according to one embodiment of the present invention.

In addition to server authentication, the client-specific key can also be used by the server to authenticate the client. FIG. 3B presents a time-state diagram describing the process of authenticating a client by a server, according to one embodiment of the present invention. During operation, client 302 can calculate a hash function based on the client-specific key and optionally the client ID (operation 322). For example, the hash function can be hash (IDC_Key) or hash (ID_C, IDC_Key). Client 302 can send a message containing its client ID in plain text and the hash function to server 304 (operation 324). For example, the message can be {ID_C, hash (ID_C, IDC_Key)}.

Upon receiving such a message, server 304 can perform a lookup in its key database the client-specific key assigned to client 302 based on the received client ID (ID_C) (operation 326), and calculate a hash function based on the lookup result and optionally the received client ID (operation 328). Depending on the agreement between client 302 and server 304, server 304 may calculate hash (ID_C, IDC_Key) or hash(IDC_Key). Server 304 can then compare its calculated hash function to the hash function received from client 302 (operation 330). If they match, server 304 can successfully authenticate client 302. Otherwise, authentication of client 302 is failed. Server 304 can optionally send the authentication result back to client 302 (operation 332).

Figure 3C:
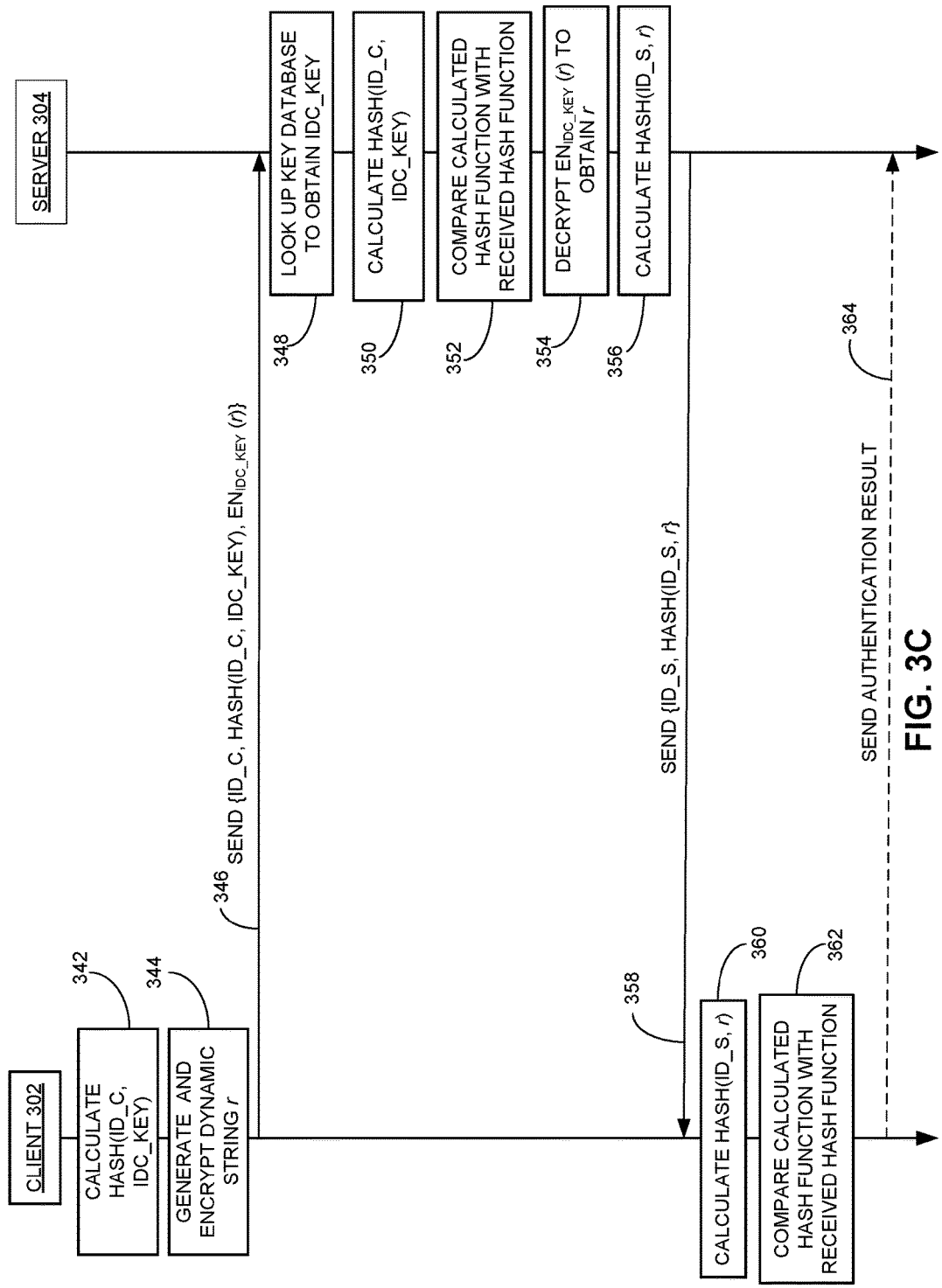
FIG. 3C presents a time-state diagram describing the process of mutual authentication between a client and a server, according to one embodiment of the present invention.

In some embodiments, before establishing a secure channel, a server and a client need to authenticate each other using the server-assigned client-specific key. FIG. 3C presents a time-state diagram describing the process of mutual authentication between a client and a server, according to one embodiment of the present invention.

During operation, client 302 can calculate a hash function based on the client ID (ID_C) and the client-specific key (IDC_Key) (operation 342). Client 302 can also generate a dynamic string (r), and encrypt the dynamic string using the client-specific key (operation 344). The encrypted message can be written as: $En_{IDC\_Key}(r)$. The dynamic string r can be generated randomly or using a predetermined algorithm. Because r changes for each authentication operation, playback attacks can be prevented. Client 302 can send the client ID in plain text, the hash function, and the encrypted dynamic string to server 304 (operation 346). For example, client 302 can send a dynamic message {ID_C, hash (ID_C, IDC_Key), $En_{IDC\_Key}(r)$} to server 304.

Upon receiving the dynamic message from client 302, server 304 can perform a lookup in its key database of the client-specific key assigned to client 302 based on the received client ID (ID_C) (operation 348), and calculate a hash function based on the lookup result and optionally the received client ID (operation 350). Server 304 can then compare its calculated hash function to the hash function received from client 302 (operation 352). If they match, server 304 can successfully authenticate client 302; otherwise, authentication of client 302 fails.

Server 304 can obtain the dynamic string by decrypting the received encrypted message, using IDC_key, $En_{IDC\_Key}(r)$ (operation 354), and generate a hash function based on the server's identification (ID_S) and the dynamic string (operation 356). The hash function can be generated as hash (ID_S, r), where (ID_S, r) is the concatenation of the server's ID and the dynamic string. Server 304 can then send the server's identification in plain text and the hash function to client 302 (operation 358). For example, server 304 can send a dynamic message {ID_S, hash (ID_S, r)} to client 302. In an alternative embodiment, server 304 may simply send {hash(r)} to client 302.

Upon receiving the message from server 304, client 302 can calculate, based on the received server ID and the previously generated dynamic string r, a hash function (e.g., hash (ID_S, r)) (operation 360), and compare the calculated hash function with the hash function received from client 302 (operation 362). If they match, client 302 can successfully authenticate server 304, thus completing the mutual authentication. Otherwise, authentication of server 304 is failed. In some embodiments, client 302 can optionally send the authentication result to server 304 (operation 364).

In some embodiments, to further ensure security, in operation 356, server 304 may generate the hash function based on ID_S and a value that is derived from the dynamic string r. For example, server 304 can generate hash (ID_S, r+n), where n is a dynamic seed value that can be synchronously updated between client 302 and 304. In other words, n is a secret shared between client 302 and server 304. For example, n can be the number of exchanges between client 302 and server 304. More details about the synchronous updating of seed value n can be described later. If server 304 sends hash(ID_S, r+n) to client 302, client 302 will need to use its locally stored dynamic r string and seed value n to generate hash(ID_S, r+n), and compare the generated hash function with the received hash function.

Compared with conventional authentication based on the exchange of the public key certificates, the new authentication scheme, such as the ones shown in FIGS. 3A-3C, no longer requires public key certificates. If the server can send the client-specific keys to clients via a separate secure channel, neither the server nor the client needs to obtain and/or maintain a public key certificate. Considering the cost and complexity involved in obtaining digital certificates from a certificate authority (CA), this new authentication scheme can significantly reduce cost without compromising security.

Figure 4:
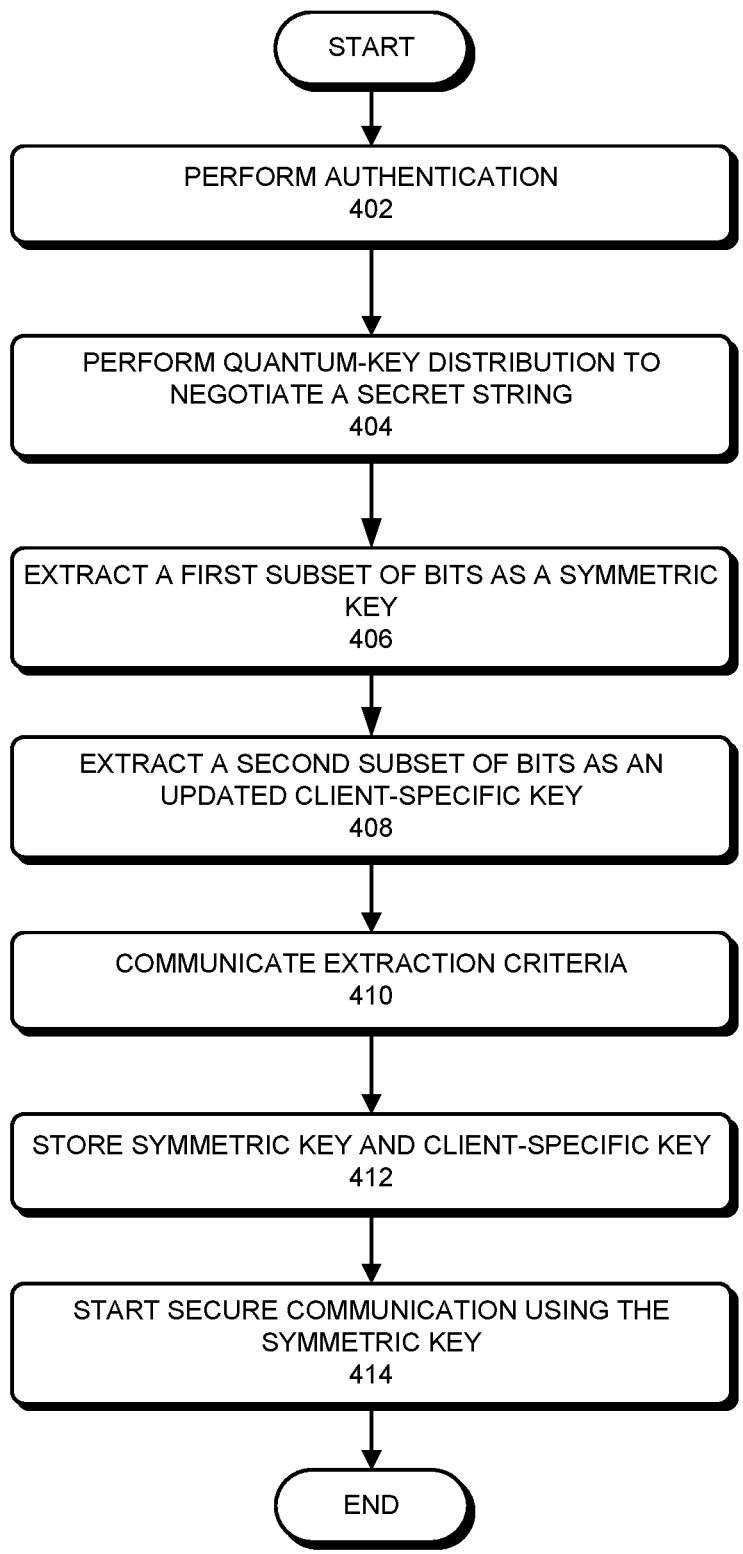
FIG. 4 presents a flow chart describing the process of establishing a secure communication channel between a server and a client, according to one embodiment of the present invention.

Subsequent to the mutual authentication between the client and the server, the client and the server can exchange a symmetric key that can be used for the secure communication. To ensure the secrecy of the symmetric key without using asymmetric encryption/decryption, in some embodiments, a quantum-key-distribution scheme can be used to distribute a symmetric key between the client and the server, thus facilitating the establishment of a secure communication channel. FIG. 4 presents a flow chart describing the process of establishing a secure communication channel between a server and a client, according to one embodiment of the present invention.

During operation, a client and a server can perform an authentication process, which can involve the server authenticating the client, the client authenticating the server, or both (operation 402). The authentication process can be similar to the one shown in FIG. 3A, 3B, or 3C. If the authentication fails, the process stops. Subsequent to successful authentication, the client and the server can negotiate, using quantum-key-distribution schemes, a secret string (operation 404). Various quantum-key-distribution schemes can be used for distributing the secret string, including but not limited to schemes based on the Bennett-Brassard-84 (BB84) or Ekert-91(E91) protocol. In some embodiments, if the client and the server have each previously established a quantum-key pool that contains quantum keys previously negotiated using quantum-key-distribution processes, operation 404 can be optional. Instead, the client and the server can synchronously obtain from the quantum-key pool a quantum key used as the secret string.

The server can then extract from the secret string, which can include a set of bits, a first subset of bits that can be used as a symmetric key for subsequent secure communications between the client and the server (operation 406). In addition to the symmetric key that can be used for establishing a secure communication channel between the client and the server, a second subset of bits can also be extracted (e.g., by the server) from the secret string (operation 408). This second set of bits can be used to replace/update the client-specific key previously assigned to the client by the server. The server can communicate the extraction criteria (e.g., the number of bits and the position of the bits) of the first and second subsets with the client to allow the client to extract the same subsets of bits from the secret string (operation 410). It is also possible for the client to determine and send the extraction criteria to the server. Alternatively, the extraction criteria can be established beforehand between the client and the server, and there is no need to communicate the extraction criteria. For example, the client and the server may agree to extract the first n bits from the secret string to be used as a symmetric key and the subsequent m bits to be used as the updated client-specific key. Alternatively, the client and the server may agree to extract the first m bits from the secret string to be used as the updated client-specific key and the subsequent n bits to be used as the symmetric key.

After extractions of the symmetric key and the updated client-specific key, the client and the server each store the symmetric key and the updated client-specific key (operation 412). More specifically, the server can store in its key database the updated client-specific key for this particular client. The updated client-specific key can later be used for authentication purposes when the client and the server initiate a new secure communication session. The client and the server can then start to communicate with each other using the symmetric key as an encryption/decryption key (operation 414).

Figure 5:
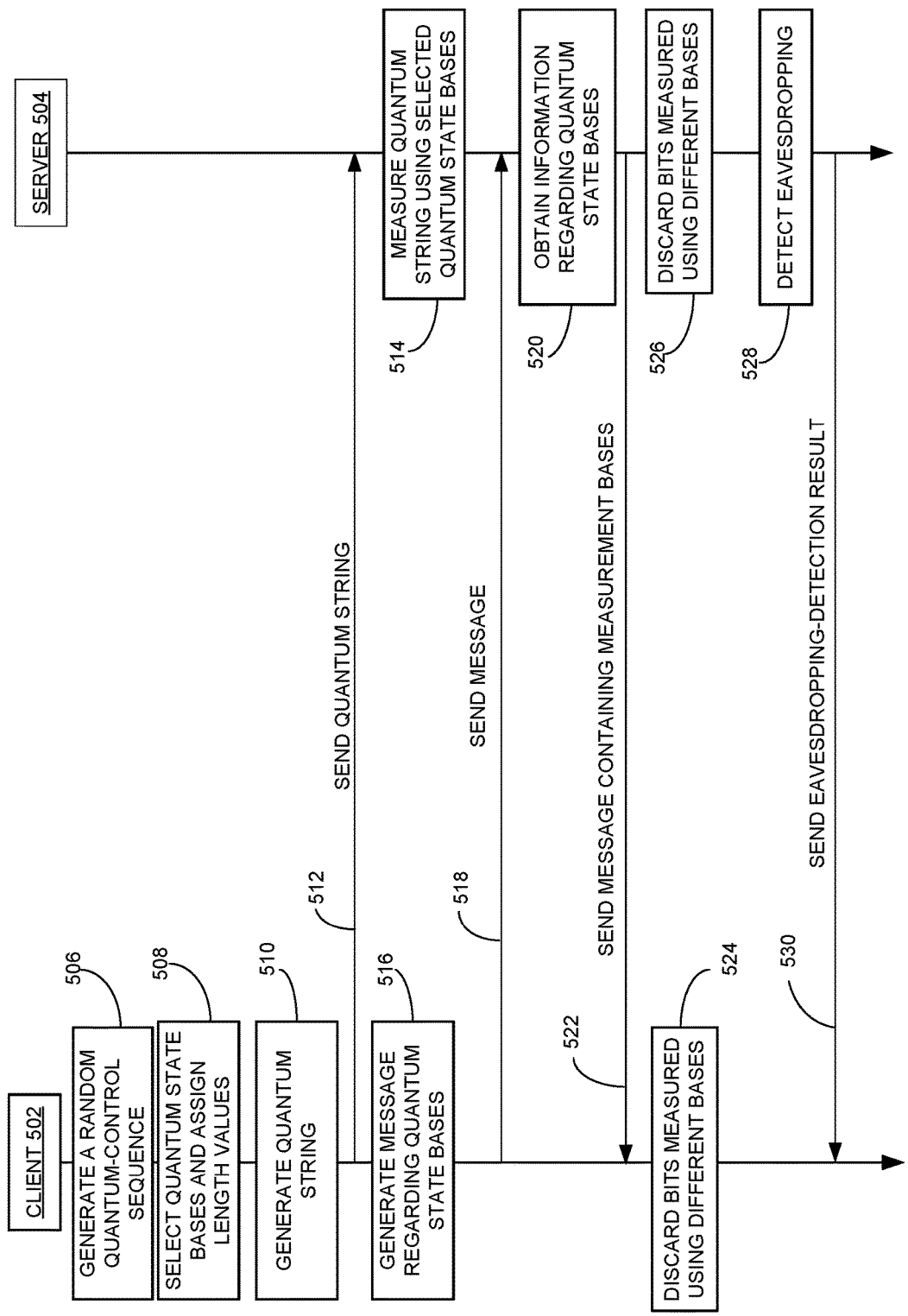
FIG. 5 presents a diagram illustrating an exemplary process for negotiating a secret string between the client and the server, in accordance with one embodiment of the present invention.

FIG. 5 presents a diagram illustrating an exemplary process for negotiating a secret string between the client and the server, in accordance with one embodiment of the present invention. During operation, a client 502 can generate a random binary string, known as a quantum-control sequence (operation 506). Client 502 can select, from a pre-installed quantum-state-basis library, a set of quantum state bases, and assigns a length value for each selected quantum state basis (operation 508). In some embodiments, the sum of the length values of the selected quantum state bases equals the length of the quantum-control sequence. For example, the quantum-state-basis identifier (QID) of the selected quantum state bases can be sequentially marked as $QID_1, QID_2, \ldots, QID_n$, and their corresponding length values can be marked as $l_1, l_2, \ldots, l_n$. If the length of the quantum-control sequence is m, then $m=l_1+l_2+ \ldots +l_n$.

Client 502 can then generate a sequence of quantum bits (qubits), also known as a quantum string, based on the selected quantum state bases, their assigned lengths, and the quantum-control sequence (operation 510). The length of the quantum string equals the length of the quantum-control sequence, with each qubit corresponding to a bit in the quantum-control sequence. For example, a particular qubit can be represented by a single photon in a certain polarization state, depending on the quantum state basis corresponding to the bit position and the bit value of a corresponding bit in the quantum-control sequence. Using a nine-bit binary string 101001011 as an example, client 502 may select quantum state bases with QID=2 and QID=4, and assign length values 3 and 6 to the selected quantum state bases, respectively. Accordingly, the first three bits of the nine-bit binary string 101001011 will be encoded using a quantum state basis with QID=2, with quantum state 2.1 used for bit value "1" and quantum state 2.2 used for bit value "0." Similarly, the subsequent six bits of the string can be encoded using a quantum state basis with QID=4, with quantum state 4.1 used for bit value "1" and quantum state 4.2 used for bit value "0."

Client 502 can then send, via a quantum channel, the quantum string (i.e., a sequence of single photons) to server 504 (operation 512). The quantum channel can include optical fibers or free space. Upon receiving the quantum string, server 504 can select, from its quantum-state-basis library, a set of quantum state bases and measure the receiving quantum string using the selected quantum state bases (operation 514).

Client 502 can generate a message that includes information regarding the quantum state bases used for generating the qubits (operation 516) and send the message to server 504 (operation 518). In some embodiments, the message can be encrypted (e.g., using the client-specific key), and can include the QIDs and their assigned length value. For example, client 502 previously selects two quantum state bases with QIDs 2 and 4, and encodes the first three bits of a binary string using a quantum state basis with QID=2 and the six following bits of the binary string using a quantum basis with QID=4; then the message can include $\{2, 3; 4, 6\}_{IDC\_Key}$, where IDC_Key is the current client-specific key of client 502. A general form of the message can be $\{QID_1, l_1; QID_2, l_2; \ldots; QID_n, l_n\}_{IDC\_Key}$. Alternatively, the message may specify the QID used for encoding each qubit. The message in the above example can be: $\{2, 2, 2, 4, 4, 4, 4, 4, 4\}_{IDC\_key}$. In this case, instead of specifying the numbers of bits encoded by each quantum state basis, the QIDs corresponding to all nine bits are listed.

To enhance security, the bit number (or length value) corresponding to each QID can also be encoded. For example, client 502 and server 504 can each maintain a length-value database, which can map bit lengths to various codes. Instead of sending a particular length value assigned to a quantum state basis, client 502 can send a code corresponding to that length value. Upon receiving the code, server 504 can perform a lookup in the length-value database to determine the particular length value assigned to a particular quantum state basis.

Upon receiving the message from client 502, server 504 can obtain quantum state basis information (e.g., the data string: $QID_1, l_1; QID_2, l_2; \ldots; QID_n, l_n$) (operation 520). In some embodiments, server 504 may need to decrypt (e.g., using the client-specific key stored on the server) the received message. Server 504 can also send a message to client 502 containing information regarding the quantum state bases used by server 504 for measuring the received qubits (operation 522). Based on these exchanged messages, client 502 and server 504 each discard the bits where server 504 uses a different quantum state basis for measurement and keep the remaining bits as the secret string (operations 524 and 526). For example, if the message sent by client 502 states {2, 3; 4, 6}, and the message sent by server 504 states {2,9}, meaning that server 504 uses a quantum state basis with QID=2 to measure all received qubits, then client 502 and server 504 will only keep the first three bits while discarding the remaining six bits.

To detect eavesdropping, server 504 can also determine whether the measurement result of the received quantum string meets one or more predetermined criteria based on the quantum state basis information (operation 528). If so, server 504 can determine that no eavesdropping is detected, and the key exchange succeeds. Otherwise, server 504 can determine that eavesdropping activities have been detected, and the key exchange fails. The predetermined criteria used for detecting eavesdropping can include the photon-loss rate, the bit error rate, or both. A more detailed description regarding criteria used for detecting eavesdropping can be found in U.S. patent application Ser. No. 15/497,678, filed 26 Apr. 2017, and entitled "METHOD AND SYSTEM FOR DETECTING EAVESDROPPING DURING DATA TRANSMISSION," the disclosure of which is incorporated herein by reference in its entirety. Server 504 can send the eavesdropping-detection result to client 502 (operation 530).

Compared to conventional key-exchange schemes, the quantum key-exchange scheme no longer involves asynchronous encryption/decryption, thus being more computationally efficient and can be faster. Moreover, the quantum key-exchange scheme can enhance security by detecting any possible eavesdropping.

Figure 6:
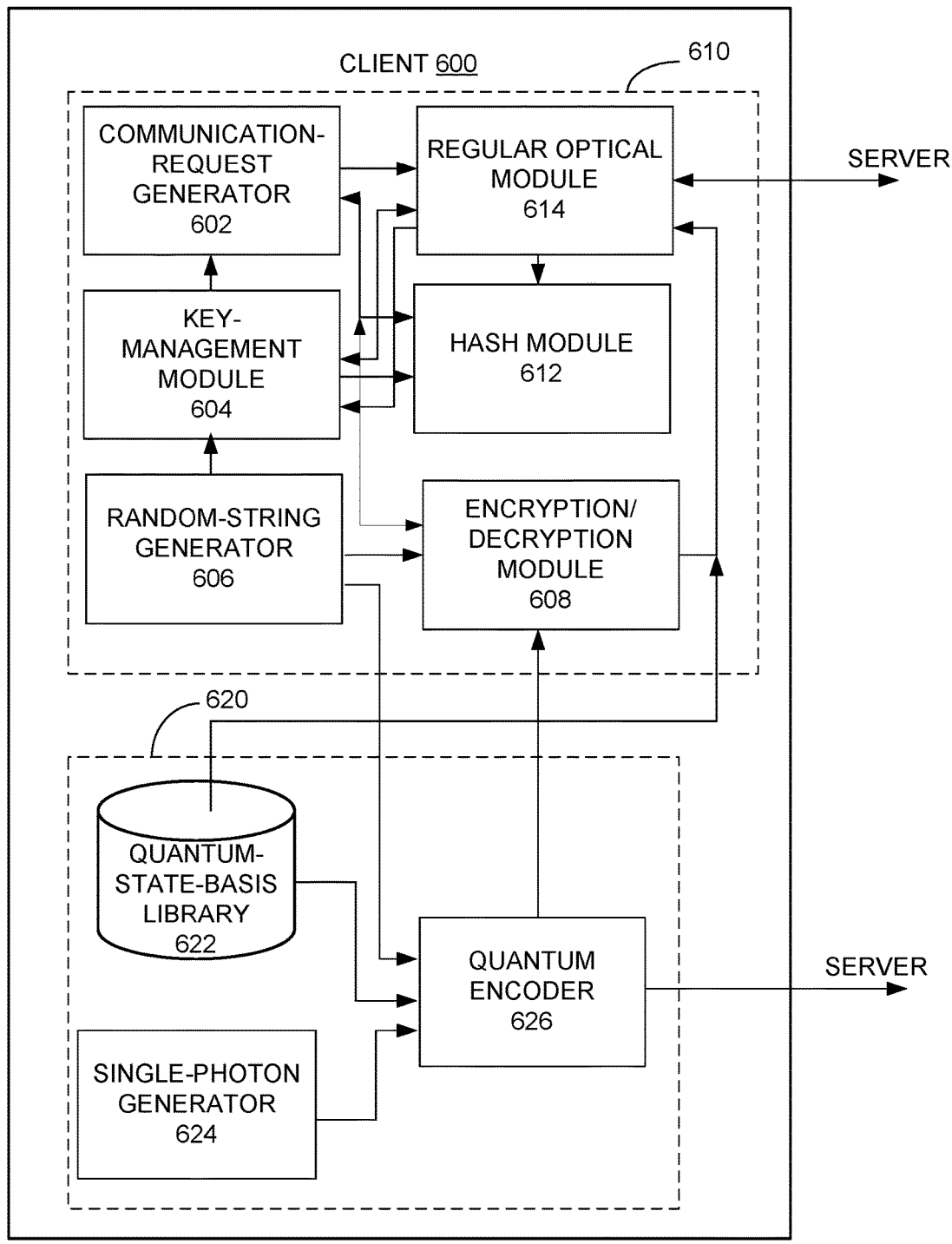
FIG. 6 presents a diagram illustrating an exemplary client device, in accordance with an embodiment of the present invention.

FIG. 6 presents a diagram illustrating an exemplary client device, in accordance with an embodiment of the present invention. Client 600 can include a regular zone 610 handling regular signals and a quantum zone 620 handling quantum signals. More specifically, regular zone 610 can include a communication-request generator 602, a key-management module 604, a random-string generator 606, an encryption/decryption module 608, a hash module 612, and a regular optical module 614; quantum zone 620 can include a quantum-state-basis library 622, a single-photon generator 624, and a quantum encoder 626.

In regular zone 610, communication-request generator 602 can be responsible for generating a request for initiating a secure communication channel, e.g., an HTTPS channel. Key-management module 604 can be responsible for storing and updating the client-specific key assigned to client 600 and the symmetric session key negotiated between client 600 and a server. Key-management module 604 can also store the client ID along with the client-specific key. Random-string generator 606 can be responsible for generating random strings. Encryption/decryption module 608 can be responsible for encryption and decryption of messages, including during authentication and key negotiation, and for subsequent secure communication. Hash module 612 is for calculating hash functions and comparing a calculated hash function with a received hash function. Regular optical module 614 can be responsible for transmitting and receiving regular optical signals based on electrical signals generated by the various modules in regular zone 610. For example, the communication request generated by communication-request generator 602 can be converted to regular optical signals by regular optical module 614 before being sent to the server via an optical channel, such as optical fibers. The regular optical signals can include any optical signal that does not carry or maintain quantum state information. Moreover, the regular optical signals can sometimes be referred to as high-intensity optical signals due to their relative higher intensity compared to quantum signals that carry quantum state information.

In quantum zone 620, quantum-state-basis library 622 stores the quantum state bases, each of which is identified by a unique identifier (QID). Single-photon generator 624 can be responsible for generating single photons. Quantum encoder 626 can be responsible for selecting quantum state bases from quantum-state-basis library 622 and encoding the single photons using selected quantum state bases, based on a random string generated by random-string generator 606.

During operation, communication-request generator 602 generates a request for initiating secure communication between client 600 and a remote server. Such a request can be in the form of an authentication request. In some embodiments, the authentication request from client 600 can include the ID of client 600, a hash function generated by hash module 612, and an encrypted random string or number r. The random string or number r can be generated by random-string generator 606 and encrypted by encryption/decryption module 608 using a client-specific key managed by key-management module 604. The hash function can be hash(ID_C, IDC_Key), where ID_C is the client ID and IDC_Key is the client-specific key, and (ID_C, IDC_Key) can be the concatenation of the two strings. Regular optical signals carrying information of the request can be generated by regular optical module 614 and sent to the server via a regular optical channel.

Subsequent to sending the authentication request, regular optical module 614 can receive from the server a regular optical signal carrying the server's response, which can include the server's ID (ID_S) and a hash function of the server's ID and the random string sent by client 600 (e.g., hash(ID_S, r)). Hash module 612 calculates a hash function using the server's ID and the random string, and compares the calculated hash function with the received hash function in order to authenticate the server.

Once the server is authenticated, quantum encoder 626 can encode a sequence of single photons using quantum state bases selected from a quantum-state-basis library 622 to generate a quantum signal. The particular quantum state (e.g., polarization state) of each photon can be determined based on a corresponding selected quantum state basis and a random quantum-control sequence generated by random-string generator 606. In other words, information associated with the random quantum-control sequence is represented by quantum states of the single photons. Quantum encoder 626 can send the quantum signal to the server via a quantum channel.

Client 600 can also send, via regular optical module 614, information regarding quantum state bases used for encoding to the server, and receive the server's feedback, indicating the quantum state bases used by the server for measurement of the quantum signal. Upon receiving such information, key-management module 604 can obtain a secret string shared between client 600 and the server by discarding bits from the quantum-control sequence corresponding to qubits that were measured using different quantum state bases. The secret string can be stored in key-management module 604. A portion of the secret string can be used to update the client-specific key, whereas the remaining portion can be used as a symmetric session key for secure communications between client 600 and the server. Such secure communications only involve regular optical signals generated by regular optical module 614.

In some embodiments, client 600 may also include a counter (not shown in FIG. 6), which can be part of key-management module 604. The counter can be synchronized with a similar counter located on the server. Both counters increment by one each time client 600 and the server interact with each other. The counter value n can be used by the server to modify a random number, based on which a hash function is calculated. This way, the hash function sent from the server back to client 600 will be hash(ID_S, r+n). Upon receiving the hash function from the server, hash module 612 can obtain the current counter value n and calculate hash(ID_S, r+n) accordingly.

Figure 7:
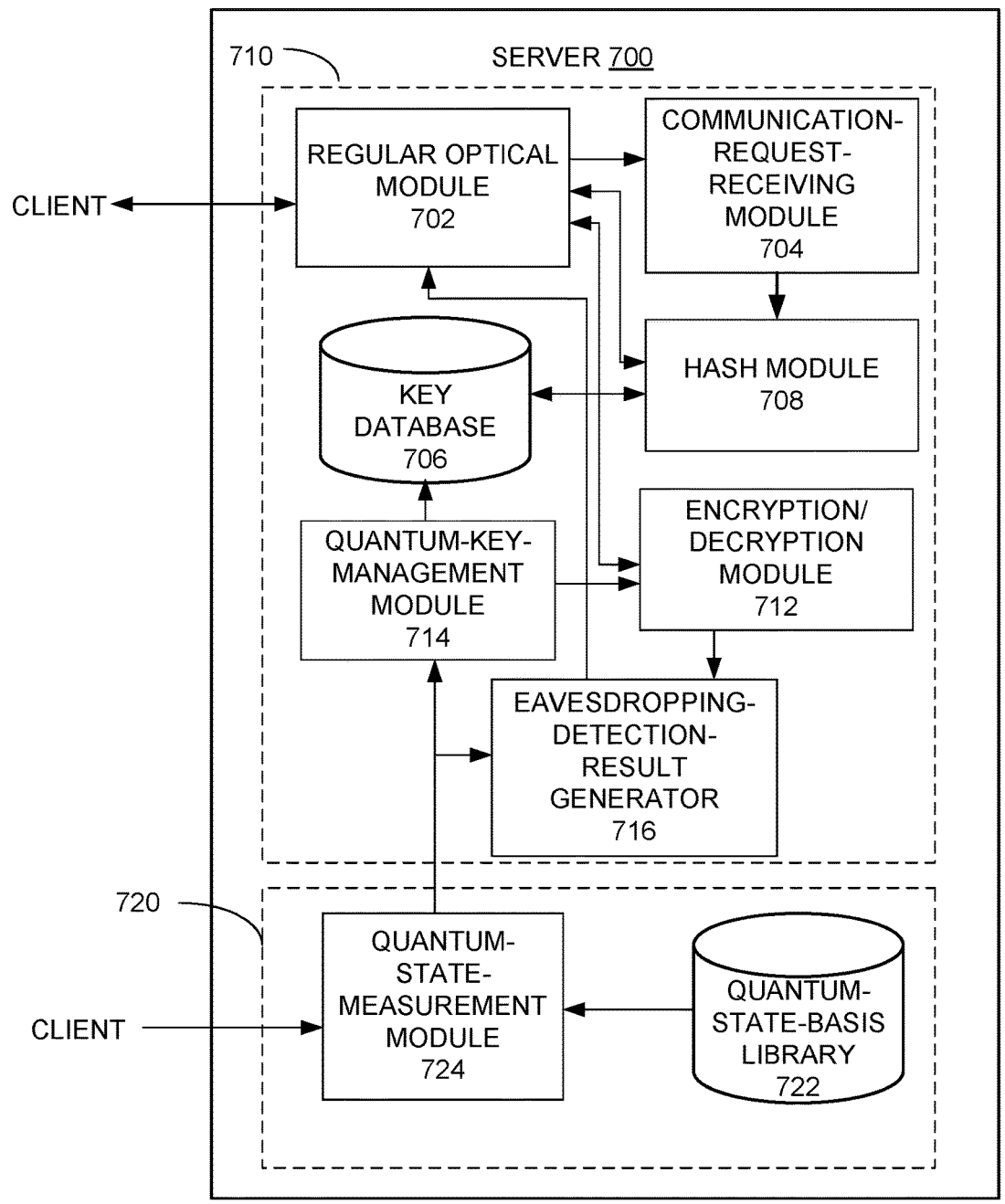
FIG. 7 presents a diagram illustrating an exemplary server device, in accordance with one embodiment of the present invention.

FIG. 7 presents a diagram illustrating an exemplary server device, in accordance with one embodiment of the present invention. Similar to client 600, server 700 can include a regular zone 710 handling regular signals and a quantum zone 720 handling quantum signals. More specifically, regular zone 710 can include a regular optical module 702, a communication-request-receiving module 704, a key database 706, a hash module 708, an encryption/decryption module 712, a quantum-key-management module 714, and an eavesdropping-detection-result generator 716; quantum zone 720 can include a quantum-state-basis library 722 and a quantum-state-measurement module 724. The functionalities of the various modules in server 700 can be similar to the corresponding ones in client 600.

During operation, communication-request-receiving module 704 can receive, via regular optical module 702, a request for secure communication from the client. Such request can be in the form of an authentication request that includes the client ID, a hash function, and an encrypted random string or number r. In some embodiments, the hash function can be the hash of the client ID and a client-specific key, such as hash(ID_C, IDC_Key). Upon receiving the request from the client, hash module 708 can obtain the client-specific key corresponding to the client ID from key database 706, and calculate a hash function based on the obtained client-specific key and the client ID. Hash module 708 can further compare the calculated hash function with the received hash function in order to authenticate the client. Encryption/decryption module 712 can perform a decryption operation to obtain the random string or number r. Hash module 708 can also generate a hash function based on the server's ID (ID_S) and the random string or number r. In some embodiments, server 700 may also include a counter (not shown in FIG. 7), which can be synchronized with a similar counter located on the client. When generating the hash function, hash module 708 may modify the random string using the counter value n. For example, hash module 708 can calculate a sum of the random string and the counter value, and calculate a hash based on the server ID and the sum. The hash function is calculated as hash(ID_S, r+n).

Quantum-state-measurement module 724 can receive quantum signal (e.g., single photons) from the client and can randomly select one or more quantum states from quantum-state-basis library 722 to measure the quantum states of the received single photons, thus obtaining a measured quantum-control sequence. Because the quantum state bases used for the measurements are not the same as the ones used by the client for transmission, the measured quantum-control sequence is not the same as the control sequence sent by the client.

Regular optical module 702 can also receive, from the client, a message that includes information regarding the quantum state bases used by the client for encoding the single photons. This message can also be encrypted (e.g., using the client-specific key). Encryption/decryption module 712 can decrypt the received message to obtain the information regarding the quantum state bases. In some embodiments, this message may also include the quantum-control sequence itself.

Quantum-key-management module 714 can determine, based on quantum state bases used for measurement and quantum state bases used by the client for encoding, which bits within the measured quantum-control sequence to be discarded. Quantum-key-management module 714 can then keep the remaining bits a secret string. A portion of the secret string can be used to update the client-specific key stored in key database 706, whereas the remaining portion can be used as a symmetric session key for secure communications between the client and server 700. The symmetric session key can either be maintained by quantum-key-management module 714. During subsequent secure communication, encryption/decryption module 712 can obtain the symmetric session key from quantum-key-management module 714.

Eavesdropping-detection-result generator 716 can obtain information regarding the quantum state bases used for encoding at the client's side and optionally the quantum-control sequence from encryption/decryption module 712, and the measured quantum-control sequence and quantum state bases used for the measurement from quantum-state-measurement module 724. Eavesdropping-detection-result generator 716 can then generate an eavesdropping-detection result based on the obtained information. More specifically, eavesdropping-detection-result generator 716 can determine whether the measurement result meets one or more predetermined criteria, and can generate a result indicating whether eavesdropping is detected. The generated eavesdropping-detection-result can be sent to the client via regular optical module 702. The predetermined criteria can be based on the photon-loss rate, the bit error rate (BER) of the measured quantum-control sequence, or both. For example, if eavesdropping-detection-result generator 716 determines that the photon-loss rate exceeds a predetermined threshold, eavesdropping-detection-result generator 716 may generate a result indicating that eavesdropping is detected.

In the examples shown in FIGS. 6 and 7, the client may be coupled to the server via a classical channel (e.g., optical fibers or free space) and a quantum channel (e.g., polarization-maintaining fibers or free space), and vice versa. This way, pure regular optical signals can be transmitted and received over the classical channel, and the quantum signals can be transmitted and received over the quantum channel. In practice, it is also possible to transmit the regular optical signals over the quantum channel. In some embodiments, the regular optical signal and the quantum signal can be multiplexed together using various multiplexing techniques, including but not limited to: wavelength-domain-multiplexing (WDM) and time-domain-multiplexing techniques. This way, only the quantum channel is needed to couple the client and server, thus reducing the system cost.

In the aforementioned examples, the entire authentication process and the key-exchange process do not require the use of an asymmetrical key pair for encryption/decryption. Instead, the computations performed by the client and the server only involve the calculation of certain hash functions and symmetric encryption/decryption, both of which are much more computationally efficient than asymmetric encryption/decryption. In addition, the quantum-key-exchange process can ensure the security of the exchanged symmetric keys, due to the laws of quantum mechanics, such as the uncertainty principle, the principle of quantum state measurement, and the no-cloning theorem.

Moreover, in the various aforementioned examples, the secure communication channel established between the client and server can be similar to an HTTPS channel established between the client and server. In practice, the presently disclosed technology can be used to enable secure data transmission between any types of network nodes. For example, a secure peer-to-peer communication channel may also be established using a similar technology, as long as the participating nodes can establish a certain secret key beforehand that is specific to one of the node or the node pair.

Figure 8:
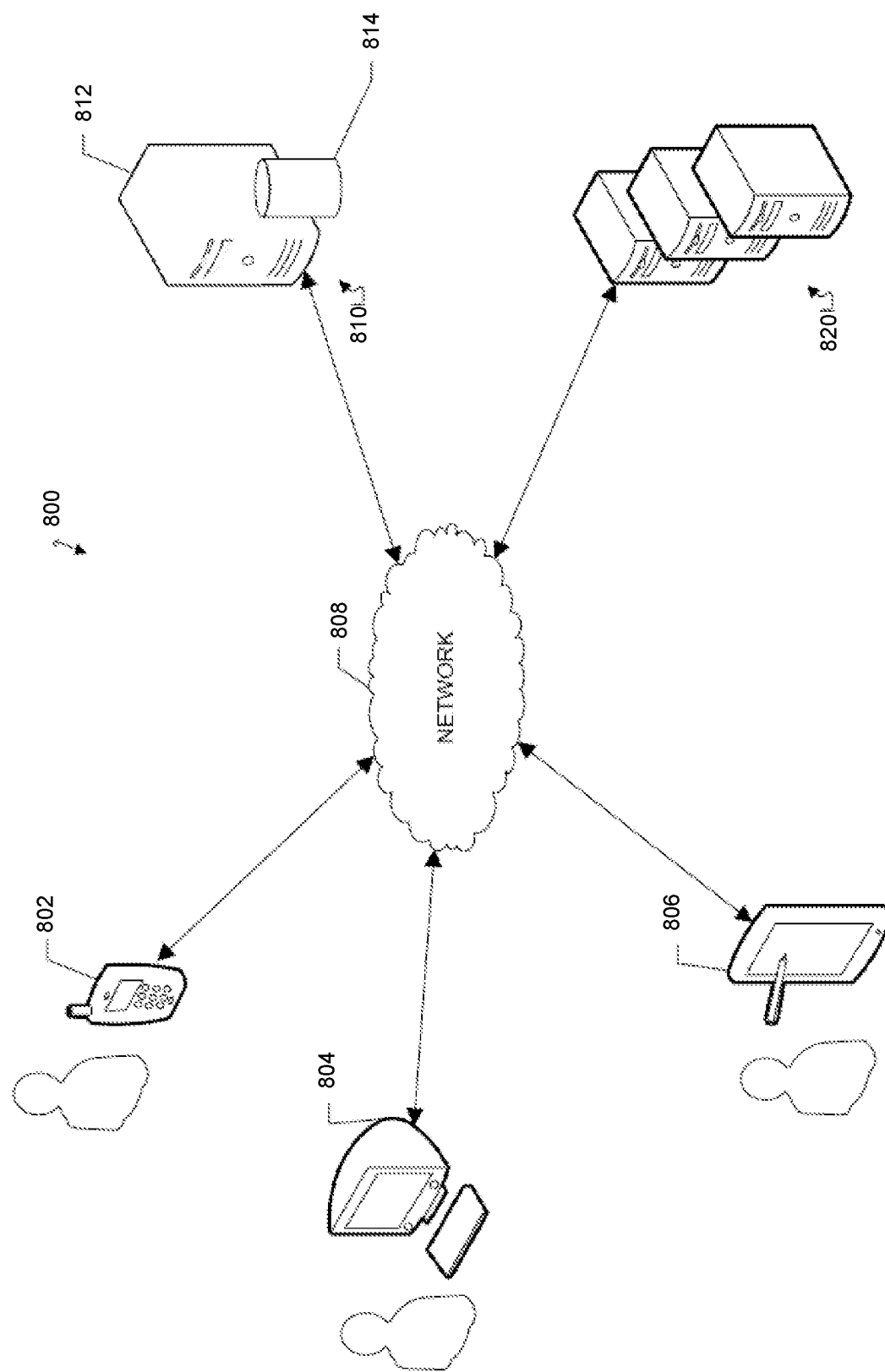
FIG. 8 illustrates an exemplary client-server network environment for implementing the disclosed eavesdropping-detection technology, in accordance with some embodiments described herein.

FIG. 8 illustrates an exemplary client-server network environment for implementing the disclosed eavesdropping-detection technology, in accordance with some embodiments described herein. A network environment 800 includes a number of electronic devices 802, 804 and 806 communicably connected to a server 810 by a network 808. One or more remote servers 820 are further coupled to the server 810 and/or the one or more electronic devices 802, 804 and 806.

In some exemplary embodiments, electronic devices 802, 804 and 806 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 802, 804 and 806 store a user agent such as a browser or application. In the example of FIG. 8, electronic device 802 is depicted as a smartphone, electronic device 804 is depicted as a desktop computer, and electronic device 806 is depicted as a PDA.

Server 810 includes a processing device 812 and a data store 814. Processing device 812 executes computer instructions stored in data store 814, for example, to assist in scheduling a customer-initiated service or a service-provider-initiated service between a service provider and a customer at electronic devices 802, 804 and 806 during a service scheduling process.

In some exemplary aspects, server 810 can be a single computing device such as a computer server. In other embodiments, server 810 can represent more than one computing device working together to perform the actions of a server computer (e.g., cloud computing). The server 810 may host the web server communicably coupled to the browser at the client device (e.g., electronic devices 802, 804 or 806) via network 808. In one example, the server 810 may host a client application for scheduling a customer-initiated service or a service-provider-initiated service between a service provider and a customer during a service scheduling process. Server 810 may further be in communication with one or more remote servers 820 either through the network 808 or through another network or communication means.

The one or more remote servers 820 may perform various functionalities and/or storage capabilities described herein with regard to the server 810 either alone or in combination with server 810. Each of the one or more remote servers 820 may host various services. For example, servers 820 may host services providing information regarding one or more suggested locations such as web pages or websites associated with the suggested locations, services for determining the location of one or more users, or establishments, search engines for identifying results for a user query, one or more user review or query services, or one or more other services providing information regarding one or more establishments, customers and/or review or feedback regarding the establishments.

Server 810 may further maintain or be in communication with social networking services hosted on one or more remote servers 820. The one or more social networking services may provide various services and may enable users to create a profile and associate themselves with other users at a remote social networking service. The server 810 and/or the one or more remote servers 820 may further facilitate the generation and maintenance of a social graph including the user-created associations. The social graphs may include, for example, a list of all users of the remote social networking service and their associations with other users of a remote social networking service.

Each of the one or more remote servers 820 can be a single computing device such as a computer server or can represent more than one computing device working together to perform the actions of a server computer (e.g., cloud computing). In one embodiment server 810 and one or more remote servers 820 may be implemented as a single server or a cluster of servers. In one example, server 810 and one or more remote servers 820 may communicate through the user agent at the client device (e.g., electronic devices 802, 804 or 806) via network 808.

Users may interact with the system hosted by server 810, and/or one or more services hosted by remote servers 820, through a client application installed at the electronic devices 802, 804, and 806. Alternatively, the user may interact with the system and the one or more social networking services through a web-based browser application at the electronic devices 802, 804, 806. Communication among client devices 802, 804, 806 and the system, and/or one or more services, may be facilitated through a network (e.g., network 808).

Communications among the client devices 802, 804, 806, server 810 and/or one or more remote servers 820 may be facilitated through various communication protocols. In some aspects, client devices 802, 804, 806, server 810 and/or one or more remote servers 820 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enable device, WiFi, or other such transceiver.

Network 808 can include, for example, any one or more of a personal area network (PAN), a local area network (LAN), a campus area network (CAN), a metropolitan area network (MAN), a wide area network (WAN), a broadband network (BBN), the Internet, and the like. Further, network 808 can include, but is not limited to, any one or more of the following network topologies, including a bus network, a star network, a ring network, a mesh network, a star-bus network, a tree or hierarchical network, and the like.

Figure 9:
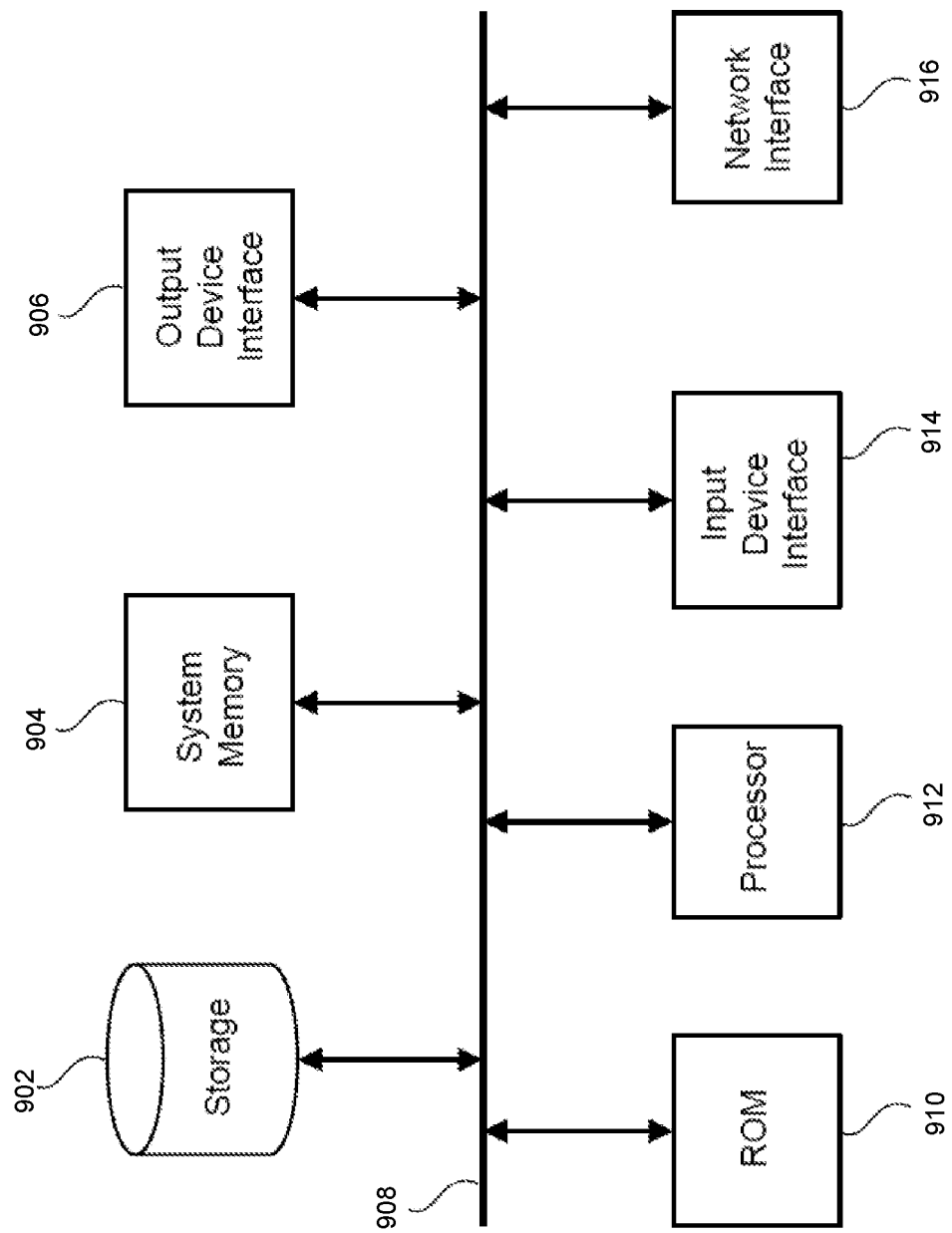
FIG. 9 conceptually illustrates an electronic system with which some implementations of the subject technology are implemented, in accordance with some embodiments described herein.

FIG. 9 conceptually illustrates an electronic system with which some implementations of the subject technology are implemented. Electronic system 900 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of electronic system 900. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random access memory. System memory 904 stores some of the instructions and data that the processor needs at runtime. In some implementations, the processes of the subject disclosure are stored in system memory 904, permanent storage device 902, and/or ROM 910. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interface 906 enables, for example, the display of images generated by electronic system 900. Output devices used with output device interface 906 include, for example, printers and display devices, such as cathode ray tubes (CRT) or liquid crystal displays (LCD). Some implementations include devices such as a touchscreen that functions as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), or an Intranet, or a network of networks, such as the Internet. Any or all components of electronic system 900 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for establishing a secure communication channel between a client and a server, the method comprising:
   generating, by the client, a first service request comprising a first dynamic message, wherein the first dynamic message includes a first hash function and a random number, wherein the first hash function is calculated based on the client's identification (ID) and a client-specific key;
   transmitting the first service request to the server, which authenticates the client based on the first dynamic message;
   receiving a second dynamic message from the server in response to the first dynamic message, wherein the second dynamic message includes a second hash function of the random number or a concatenation of the server's ID and the random number;
   authenticating the server by calculating a third hash function based at least on the random number and by comparing the calculated third hash function with the second hash function included in the second dynamic message;
   negotiating, via a quantum-key-distribution process, a secret key shared between the client and the server; and
   establishing a secure communication channel between the client and the server based on as least a first portion of the secret key.

2. The computer-implemented method of claim 1, wherein establishing the secure communication channel comprises using the first portion of the secret key as a symmetric encryption/decryption key for data transmission.

3. The computer-implemented method of claim 1, wherein the first dynamic message further includes the client's ID, and wherein the client-specific key is previously shared between the client and the server.

4. The computer-implemented method of claim 1, wherein the random number is encrypted with the client-specific key.

5. The computer-implemented method of claim 1, further comprising:
   extracting a second portion of the secret key; and
   updating the client-specific key using a second portion of the secret key.

6. A client device for establishing a secure communication channel between the client device and a server device, the client device comprising:
   a service request generator configured to generate a service request that includes a first dynamic message, wherein the first dynamic message includes a first hash function and a random number, wherein the first hash function is calculated based on the client's identification (ID) and a client-specific key;

a service request transmitter configured to transmit the first dynamic message to the server device, which authenticates the client device based on the first dynamic message;

a receiver configured to receive a second dynamic message from the server device in response to the first dynamic message, wherein the second dynamic message includes a second hash function of the random number or a concatenation of the server's ID and the random number;

an authentication module configured to authenticate the server device by calculating a third hash function based at least on the random number and by comparing the calculated third hash function with the second hash function included in the second dynamic message;

a quantum-key-distribution module configured to distribute a secret key between the client and the server; and a key-management module configured to extract at least a first portion of the secret key to be used as a symmetric encryption/decryption key for the secure communication channel, wherein implementations of the service request generator, the service request transmitter, the receiver, the authentication module, the quantum-key-distribution module, and the key-management module comprise hardware processors.

7. The client device of claim 6, wherein the client-specific key is previously shared between the client and the server, and wherein the first dynamic message further includes the client's ID.

8. The client device of claim 6, wherein the key-management module is further configured to:
extract a second portion of the secret key; and
update the client-specific key using the second portion of the secret key.

9. A computer-implemented method for establishing a secure communication channel between a client and a server, the method comprising:
receiving, by the server, a service request comprising a first dynamic message, wherein the first dynamic message includes a first hash function and a random number, wherein the first hash function is calculated based on the client's identification (ID) and a client-specific key;
authenticating the client based on the first dynamic message;
generating a second dynamic message based on information included in the first dynamic message, wherein the second dynamic message includes a second hash function of the random number or a concatenation of the server's ID and the random number;
sending the second dynamic message to the client, which authenticates the server by calculating a third hash function based at least on the random number and by comparing the calculated third hash function with the second hash function included in the second dynamic message;
negotiating, via a quantum-key-distribution process, a secret key shared between the client and the server; and
establishing a secure communication channel between the client and the server based on at least a first portion of the secret key.

10. The computer-implemented method of claim 9, wherein establishing the secure communication channel comprises using the first portion of the secret key as a symmetric encryption/decryption key for data transmission.

11. The computer-implemented method of claim 9, wherein the first dynamic message further includes the client's ID, and wherein the client-specific key is previously shared between the client and the server.

12. The computer-implemented method of claim 9, wherein authenticating the client involves:
looking up a key database to identify a locally stored client-specific key based on the client's ID included in the first dynamic message;
calculating a hash function based on the locally stored client-specific key; and
comparing the calculated hash function with the first hash function included in the first dynamic message.

13. The computer-implemented method of claim 12, further comprising:
extracting a second portion of the secret key; and
updating the locally stored client-specific key using the second portion of the secret key.

14. A server device for establishing a secure communication channel between a client device and the server, the server device comprising:
a service request receiver configured to receive a service request comprising a first dynamic message from the client device, wherein the first dynamic message includes a first hash function and a random number, wherein the first hash function is calculated based on the client's identification (ID) and a client-specific key;
an authentication module configured to authenticate the client device based on the first dynamic message;
a message generator configured to generate a second dynamic message based on information included in the first dynamic message, wherein the second dynamic message includes a second hash function of the random number or a concatenation of the server's ID and the random number;
a transmitter configured to transmit the second dynamic message to the client device, which authenticates the server device by calculating a third hash function based at least on the random number and by comparing the calculated third hash function with the second hash function included in the second dynamic message;
a quantum-key-distribution module configured to distribute a secret key between the client device and the server device; and
a key-management module configured to extract at least a first portion of the secret key to be used as a symmetric encryption/decryption key for the secure communication channel;
wherein implementations of the service request receiver, the authentication module, the message generator, the transmitter, the quantum-key-distribution module, and the key-management module comprise hardware processors.

15. The server device of claim 14, wherein the first dynamic message further includes the client's ID, and wherein the client-specific key is previously shared between the client and the server.

16. The server device of claim 14, wherein while authenticating the client, the authentication module is configured to:
look up a key database to identify a locally stored client-specific key based on the client ID included in the first dynamic message;
calculate a hash function based on the locally stored client-specific key; and
compare the calculated hash function with the first hash function included in the first dynamic message.

17. The server of claim 16, wherein the key-management module is further configured to:
   extract a second portion of the secret key; and
   update the locally stored client-specific key using the second portion of the secret key.

* * * * *